(12) United States Patent
McKenney

(10) Patent No.: US 10,459,761 B2
(45) Date of Patent: *Oct. 29, 2019

(54) ENABLING REAL-TIME CPU-BOUND IN-KERNEL WORKLOADS TO RUN INFINITE LOOPS WHILE KEEPING RCU GRACE PERIODS FINITE

(71) Applicant: International Business Machines Corporation, Armonk, NY (US)

(72) Inventor: Paul E. McKenney, Beaverton, OR (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/151,619

(22) Filed: Oct. 4, 2018

(65) Prior Publication Data

US 2019/0034231 A1 Jan. 31, 2019

Related U.S. Application Data

(63) Continuation of application No. 15/424,933, filed on Feb. 6, 2017, now Pat. No. 10,146,579, which is a continuation of application No. 15/375,143, filed on Dec. 11, 2016, now Pat. No. 10,146,577.

(51) Int. Cl.
*G06F 9/46* (2006.01)
*G06F 9/48* (2006.01)
*G06F 9/50* (2006.01)

(52) U.S. Cl.
CPC ............ *G06F 9/4887* (2013.01); *G06F 9/505* (2013.01)

(58) Field of Classification Search
None
See application file for complete search history.

(56) References Cited

U.S. PATENT DOCUMENTS

| 5,442,758 A | 8/1995 | Slingwine et al. |
| 5,608,893 A | 4/1997 | Slingwine et al. |
| 5,662,184 A | 9/1997 | Riemer et al. |
| 5,727,209 A | 3/1998 | Slingwine et al. |
| 6,219,690 B1 | 4/2001 | Slingwine et al. |
| 6,779,181 B1 | 8/2004 | Yu et al. |

(Continued)

OTHER PUBLICATIONS

P. McKenney et al., "Read-Copy Update: Using Execution History to Solve Concurrency Problems," PDCS, 1998-10, 11 pages.

(Continued)

*Primary Examiner* — Hiren P Patel
(74) *Attorney, Agent, or Firm* — Walter W. Duft

(57) ABSTRACT

A technique for enabling a real-time CPU-bound in-kernel workload to run an infinite loop while keeping read-copy update (RCU) grace periods finite. In an embodiment, a per-CPU indicator may be set to indicate that a CPU running the CPU-bound in-kernel workload has not reported an RCU quiescent state within a first defined time. An RCU grace period operation may be invoked from within the workload that causes an RCU quiescent state to be reported on behalf of the CPU if the per-CPU indicator is set. If the RCU quiescent state is not reported within a second defined time that is longer than the first defined time and sufficiently long to indicate an error condition requiring CPU rescheduling, the CPU may be rescheduled.

13 Claims, 8 Drawing Sheets

(56) References Cited

U.S. PATENT DOCUMENTS

| | | |
|---|---|---|
| 6,886,162 B1 | 4/2005 | McKenney |
| 6,996,812 B2 | 2/2006 | McKenney |
| 7,191,272 B2 | 3/2007 | McKenney |
| 7,287,135 B2 | 10/2007 | McKenney et al. |
| 7,353,346 B2 | 4/2008 | McKenney et al. |
| 7,349,879 B2 | 6/2008 | McKenney et al. |
| 7,395,263 B2 | 7/2008 | McKenney |
| 7,395,383 B2 | 7/2008 | McKenney |
| 7,426,511 B2 | 9/2008 | McKenney |
| 7,454,581 B2 | 11/2008 | McKenney et al. |
| 7,472,228 B2 | 12/2008 | McKenney et al. |
| 7,653,791 B2 | 1/2010 | McKenney |
| 7,689,789 B2 | 3/2010 | McKenney et al. |
| 7,721,129 B2 | 5/2010 | Kazachinsky et al. |
| 7,734,879 B2 | 6/2010 | McKenney et al. |
| 7,734,881 B2 | 6/2010 | McKenney et al. |
| 7,747,805 B2 | 6/2010 | McKenney |
| 7,814,082 B2 | 10/2010 | McKenney |
| 7,818,306 B2 | 10/2010 | McKenney et al. |
| 7,904,436 B2 | 3/2011 | McKenney |
| 7,953,708 B2 | 5/2011 | McKenney et al. |
| 7,953,778 B2 | 5/2011 | McKenney et al. |
| 8,020,160 B2 | 9/2011 | McKenney |
| 8,055,860 B2 | 11/2011 | McKenney et al. |
| 8,055,918 B2 | 11/2011 | McKenney et al. |
| 8,108,696 B2 * | 1/2012 | Triplett ............. G06F 1/3203 713/300 |
| 8,126,843 B2 | 2/2012 | McKenney et al. |
| 8,176,489 B2 | 5/2012 | Bauer et al. |
| 8,185,704 B2 | 5/2012 | McKenney et al. |
| 8,195,893 B2 | 6/2012 | Triplett |
| 8,407,503 B2 | 3/2013 | McKenney |
| 8,495,641 B2 | 7/2013 | McKenney |
| 8,615,771 B2 | 12/2013 | McKenney |
| 8,706,706 B2 | 4/2014 | McKenney |
| 8,874,535 B2 | 10/2014 | McKenney |
| 8,924,655 B2 | 12/2014 | McKenney |
| 8,938,631 B2 | 1/2015 | McKenney |
| 8,972,801 B2 | 3/2015 | McKenney |
| 9,003,420 B2 | 4/2015 | McKenney |
| 9,189,413 B2 | 11/2015 | McKenney |
| 9,250,978 B2 | 2/2016 | McKenney |
| 9,256,476 B2 | 2/2016 | McKenney |
| 9,348,765 B2 | 5/2016 | McKenney |
| 9,396,226 B2 | 6/2016 | McKenney |
| 9,389,925 B2 | 7/2016 | McKenney |
| 9,519,307 B2 * | 12/2016 | McKenney ............. G06F 1/14 |
| 9,552,236 B2 * | 1/2017 | McKenney ............. G06F 9/526 |
| 9,940,290 B2 * | 4/2018 | McKenney ......... G06F 13/4081 |
| 9,965,432 B2 * | 5/2018 | McKenney ......... G06F 13/4081 |
| 10,146,577 B2 * | 12/2018 | McKenney ............. G06F 9/505 |
| 10,146,579 B2 * | 12/2018 | McKenney ............. G06F 9/505 |
| 2008/0082532 A1 | 4/2008 | McKenney |
| 2013/0061071 A1 | 3/2013 | McKenney |
| 2014/0380084 A1 | 12/2014 | McKenney |
| 2016/0335136 A1 | 11/2016 | McKenney |
| 2016/0335183 A1 | 11/2016 | McKenney |

OTHER PUBLICATIONS

P. McKenney et al., "Read-Copy Update," 2001 Ottawa Linux symposium, 2001-07, 22 pages.
H. Lindar et al., "Scalability of the Directory Entry Cache," 2002 Ottawa Linux Symposium, Jun. 26, 2002, pp. 289-300.
P. McKenney et al.,"Read-Copy Update," 2002 Ottawa Linux Symposium, Jul. 8, 2002, 32 pages.
A. Arcangeli et al., "Using Read-Copy-Update Techniques for System V IPC in the Linux 2.5 Kernel," 2003 FREENIX, Jun. 14, 2003, 13 pages.
P. McKenney et al., "Using RCU in the Linux 2.5 Kernel," Linux Journal, Oct. 1, 2003, 11 pages.
P. McKenney et al., "Scaling dcache with RCU," Linux Journal, Jan. 1, 2004, 12 pages.
P. McKenney, "RCU vs. Locking Performance on Different CPUs," 2004 Linux.conf.au, 2004, 18 pages.
P. Zijlstra, "[PATCH] slab: document SLAB_DESTROY_BY_RCU", LKML.org, Nov. 13, 2008, 1 page.
D. Sarma et al., "Making RCU Safe for Deep Sub-Millisecond Response Realtime Applications," 2004 USENIX (UseLinux track) Jun. 2004, 9 pages.
P. McKenney et al., "Extending RCU for Realtime and Embedded Workloads," 2006 Ottawa Linux Symposium, Aug. 11, 2006, 15 pages.
P. McKenney, "Sleepable RCU", LWN.net, Oct. 9, 2006, 10 pages.
T. Gleixner, High Resolution Timers / Dynamic Tics—V2, LWN.net, Oct. 31, 2006, 5 pages.
P. McKenney, "RCU and Unloadable Modules", LWN.net, Jan. 14, 2007, 4 pages.
P. McKenney, "Using Promela and Spin to verify parallel algorithms", LWN.net, Aug. 1, 2007, 11 pages.
P. McKenney, "The design of preemptible read-copy-update," LWN.net, Oct. 8, 2007, 27 pages.
T. Hart et al., "Performance of memory reclamation for lockless synchronization", Journal of Parallel and Distributed Computing, Dec. 2007, pp. 1270-1285.
P. McKenney, "What is RCU, Fundamentally", LWN.net, Dec. 17, 2007, 15 pages.
P. McKenney, What is RCU? Part 2: Usage, LWN.net, Dec. 24, 2007, 15 pages.
P. McKenney, RCU part 3: the RCU API, LWN.net, Jan. 7, 2008, 7 pages.
P. McKenney, "Integrating and Validating dynticks and Preemptible RCU," LWN.net, Apr. 22, 2008, 19 pages.
D. Guniguntala et al., "The read-copy-update mechanism for supporting real-time applications on shared-memory multiprocessor systems with Linux", IBM Systems Journal vol. 47 No. 2, 2008, pp. 221-236.
P. McKenney, "Introducing Technology Into Linux", 2008 Linux Developer Symposium, China, 2008, 47 pages.
P. McKenney, "Hierarchical RCU," LWN.net, Nov. 4, 2008, 19 pages.
P. McKenney, "Using a Malicious User-Level RCU to Torture RCU-Based Algorithms", linux.conf.au, Jan. 2009, 51 pages.
M. Desnoyers, "Low-Impact Operating System Tracing", University of Montreal, PhD Thesis, Dec. 2009, 233 pages.
P. McKenney, "RCU: The Bloatwatch Edition", LWN.net, Mar. 17, 2009, 9 pages.
P. McKenney, "Expedited "big hammer" RCU grace periods", LKML.org, Jun. 25, 2009, 2 pages.
P. McKenney, "RCU cleanups and simplified preemptable RCU", LKML.org, Jul. 23, 2009, 1 page.
P. McKenney, "Deterministic Synchronization in Multicore Systems: the Role of RCU", Aug. 18, 2009, pp. 1-9.
P. McKenney, "Simplicity Through Optimization", linux.conf.au, Jan. 2010, 109 pages.
P. McKenney, "The RCU API, 2010 Edition", LWN.net, Dec. 8, 2010, 11 pages.
J. Triplett et al., "Resizable, Scalable, Concurrent Hash Tables via Relativistic Programming", ACM-SIGOPS Operating System Review vol. 44, Issue 3, Jul. 2010, 14 pages.
M. Desnoyers et al., "User-Level Implementations of Read-Copy Update", IEEE Transactions on Parallel and Distributed Systems, vol. x, No. y, Jul. 2009, pp. 1-14.
P. McKenney, "Making RCU Safe for Battery-Powered Devices", Embedded Linux Conference, Feb. 15, 2012, pp. 1-66.
P. McKenney, "Real-Time Response on Multicore Systems: It Is Bigger Than You Think", OSPERT '12 Workshop, Jul. 10, 2012, pp. 1-34.
P. McKenney, "Getting RCU Further Out of the Way", 2012 Linux Plumbers Conference, Real Time Microconference, Aug. 31, 2012, 31 pages.
P. McKenney, "The new visibility of RCU processing", LWN.net, Oct. 10, 2012, 4 pages.
P. McKenney, "CPU, Hotplug, RCU, and big.LITTLE", Linaro Connect, Nov. 1, 2012, 33 pages.

(56) References Cited

OTHER PUBLICATIONS

P. McKenney, Bare-Metal Multicore Performance in a General-Purpose Operating System, Multicore World, Feb. 2013, 66 pages.
P. McKenney, "Simplifying RCU", LWN.net, Mar. 6, 2013.
P. McKenney, "User-space RCU", LWN.net, Nov. 13, 2013, 15 pages.
J. Corbet, "The RCU-tasks subsystem", LWN.net, Jul. 30, 2014.
P. McKenney, "The RCU API, 2014 Edition", LWN.net, Sep. 4, 2014.
Podimek et al., "A Non-Intrusive Read-Copy-Update for UTS", 2012 IEEE 18th International Conference on Parallel and Distributed Systems, 2012, 8 pages.
International Business Machines Corporation, "List of IBM Patents or Patent Applications Treated as Related", Oct. 4, 2018, 2 pages.

\* cited by examiner

```
                IPI processing code from rcu_implicit_dynticks_qs() – Linux version 4.5

1    rcrmp = &per_cpu(rcu_sched_qs_mask, rdp->cpu);
2    if (ULONG_CMP_GE(jiffies,
3                    rdp->rsp->gp_start + jiffies_till_sched_qs) ||
4        ULONG_CMP_GE(jiffies, rdp->rsp->jiffies_resched)) {
5            if (!(READ_ONCE(*rcrmp) & rdp->rsp->flavor_mask)) {
6                    WRITE_ONCE(rdp->cond_resched_completed,
7                               READ_ONCE(rdp->mynode->completed));
8                    smp_mb(); /* ->cond_resched_completed before *rcrmp. */
9                    WRITE_ONCE(*rcrmp,
10                              READ_ONCE(*rcrmp) + rdp->rsp->flavor_mask);
11                   resched_cpu(rdp->cpu);  /* Force CPU into scheduler. */
12                   rdp->rsp->jiffies_resched += 5; /* Enable beating. */
13           } else if (ULONG_CMP_GE(jiffies, rdp->rsp->jiffies_resched)) {
14                   /* Time to beat on that CPU again! */
15                   resched_cpu(rdp->cpu);  /* Force CPU into scheduler. */
16                   rdp->rsp->jiffies_resched += 5; /* Re-enable beating. */
17           }
18   }
19
20   return 0;
21}
```

FIG. 6 (Prior Art)

Modified IPI processing code from modified rcu_implicit_dynticks_qs()

```
1    rcrmp = &per_cpu(rcu_sched_qs_mask, rdp->cpu);
2    if (ULONG_CMP_GE(jiffies,
3                    rdp->rsp->gp_start + jiffies_till_sched_qs) ||
4        ULONG_CMP_GE(jiffies, rdp->rsp->jiffies_resched)) {
5            if (!(READ_ONCE(*rcrmp) & rdp->rsp->flavor_mask)) {
6                    WRITE_ONCE(rdp->cond_resched_completed,
7                               READ_ONCE(rdp->mynode->completed));
8                    smp_mb(); /* ->cond_resched_completed before *rcrmp. */
9                    WRITE_ONCE(*rcrmp,
10                              READ_ONCE(*rcrmp) + rdp->rsp->flavor_mask);
11           }
12           rdp->rsp->jiffies_resched += 5; /* Re-enable beating. */
13   }
14
15   /*
16    * If more than halfway to RCU CPU stall-warning time, do
17    * a resched_cpu() to try to loosen things up a bit.
18    */
19   if (jiffies - rdp->rsp->gp_start > rcu_jiffies_till_stall_check() / 2)
20           resched_cpu(rdp→cpu);
21
22   return 0;
22 }
```

70

*FIG. 7* ized source code changes that directly or indirectly cause processor hardware to implement the disclosed subject matter. These changes may be made in source files that contain source code relating to the methodology for enabling real-time CPU-bound in-kernel workloads to run infinite loops while keeping RCU grace periods finite, as previously described.

ENABLING REAL-TIME CPU-BOUND IN-KERNEL WORKLOADS TO RUN INFINITE LOOPS WHILE KEEPING RCU GRACE PERIODS FINITE

BACKGROUND

1. Field

The present disclosure relates to computer systems and methods in which data resources are shared among data consumers while preserving data integrity and consistency relative to each consumer. More particularly, the disclosure concerns a mutual exclusion mechanism known as "read-copy update."

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to both uniprocessor and multiprocessor computing environments wherein the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory, and such operation may thus be referred to as a reclaimer. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables. Moreover, the list itself is a type of data structure.

It is assumed that the data element list of FIGS. 1A-1D is traversed (without locking) by multiple readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock (to exclude other updaters), allocating new memory for B', copying the contents of B to B', modifying B' as needed, updating the pointer from A to B so that it points to B', and releasing the lock. In current versions of the Linux® kernel, pointer updates performed by updaters can be implemented using the rcu_assign_pointer( ) primitive. As an alternative to locking during the update operation, other techniques such as non-blocking synchronization or a designated update thread could be used to serialize data updates. All subsequent (post update) readers that traverse the linked list, such as the reader r2, will see the effect of the update operation by encountering B' as they dereference B's pointer. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays. In current versions of the Linux® kernel, pointer dereferences performed by readers can be implemented using the rcu_dereference( ) primitive.

At some subsequent time following the update, r1 will have continued its traversal of the linked list and moved its reference off of B. In addition, there will be a time at which no other reader task is entitled to access B. It is at this point, representing an expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following the expiration of a grace period.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. For RCU implementations embodied in operating system kernels, a context switch, an idle loop, and user mode execution have been treated as implicit quiescent states. In modern kernel-based RCU implementations, a quiescent state is typically delineated by a kernel code path being outside an RCU read-side critical section. RCU read-side primitives such as rcu_ read_lock( ) and rcu_read_unlock( ) are commonly used by the readers to denote the beginning and end of such critical sections.

In FIG. 3, four tasks 0, 1, 2, and 3 running on four separate CPUs are shown to pass periodically through quiescent states (represented by the vertical bars). The grace period (shown by the dotted vertical lines) encompasses the time frame in which all four tasks that began before the start of the grace period have passed through one quiescent state. If the four tasks 0, 1, 2, and 3 were reader tasks traversing the linked lists of FIGS. 1A-1D or FIGS. 2A-2C, none of these tasks having reference to the old data element B prior to the grace period could maintain a reference thereto following the grace period. All post grace period searches conducted by these tasks would bypass B by following the updated pointers created by the updater.

A CPU-bound infinite loop in the Linux® kernel has traditionally been considered to be an error condition. In Linux®-based RCU implementations, RCU will respond to such a loop by sending the offending CPU an inter-processor interrupt (IPI) in an attempt to move the current grace period forward. This IPI is normally requested using the resched_cpu( ) function provided by the Linux-kernel scheduler for RCU's use.

However, Linux® users are starting to construct real-time systems that involve processes that run infinite CPU-bound loops within the Linux® kernel, for example, using the so-called "new API" (NAPI) to handle networking traffic without interrupt overhead. This means that it is no longer acceptable for RCU to send IPIs to CPUs running in-kernel CPU-bound tight loops in the common case. However, it is still necessary to send such IPIs in response to error conditions resulting in such loops.

Applicant submits that it would be desirable to provide a new technique that allows RCU grace periods to advance despite errors resulting in in-kernel infinite loops, but that also avoids sending IPIs to well-behaved real-time workloads that leverage in-kernel CPU-bound tight loops. The new technique should not have to rely on scheduling-clock interrupts because there won't be any on CPUs configured not to use them. This will be the case in Linux® kernels configured with the CONFIG_NO_HZ_FULL compile parameter. This parameter enables a tickless mode of operation wherein CPUs that are idle or have only one runnable task do not receive scheduling-clock ticks.

SUMMARY

A method, system and computer program product are provided for enabling a real-time CPU-bound in-kernel workload to run an infinite loop while keeping read-copy update (RCU) grace periods finite. In an embodiment, a per-CPU indicator may be set to indicate that a CPU running the CPU-bound in-kernel workload has not reported an RCU quiescent state within a first defined time. An RCU grace period operation may be invoked from within the workload that causes an RCU quiescent state to be reported on behalf of the CPU if the per-CPU indicator is set. If the RCU quiescent state is not reported within a second defined time that is longer than the first defined time and sufficiently long to indicate an error condition requiring CPU rescheduling, the CPU may be rescheduled.

BRIEF DESCRIPTION OF THE DRAWINGS

The foregoing and other features and advantages will be apparent from the following more particular description of example embodiments, as illustrated in the accompanying Drawings.

FIG. 6 is a C-language source code diagram showing part of a prior art Linux® kernel function named rcu_implicit_dynticks_qs( ).

FIG. 7 is a C-language source code diagram showing part of a modified version of the Linux® kernel function named rcu_implicit_dynticks_qs( ) according to an embodiment of the present disclosure.

DETAILED DESCRIPTION OF EXAMPLE EMBODIMENTS

Figure 1A:
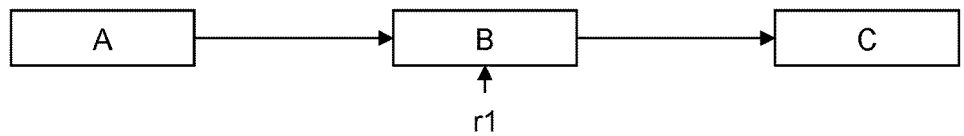
FIGS. 1A-1D are diagrammatic representations of a linked list of data elements undergoing a data element replacement according to a conventional read-copy update mechanism.
Figure 1B:
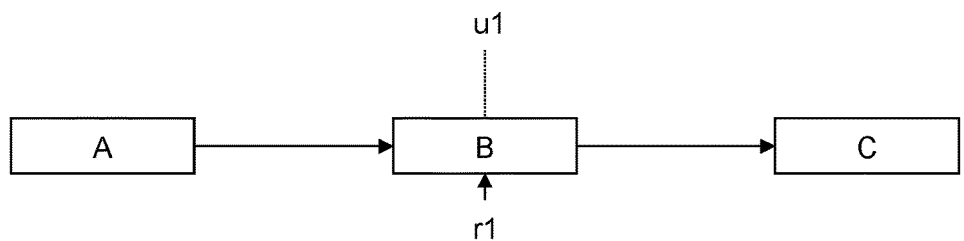
Figure 1C:
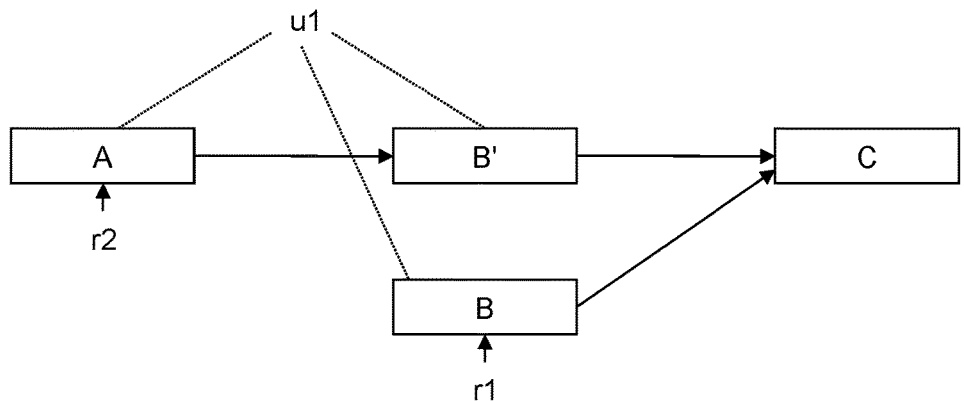
Figure 1D:
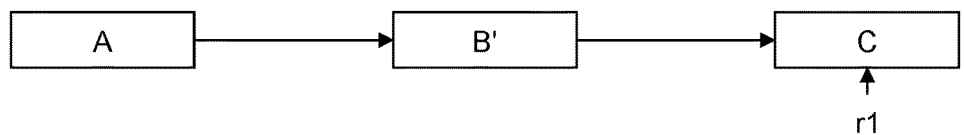
Figure 2A:
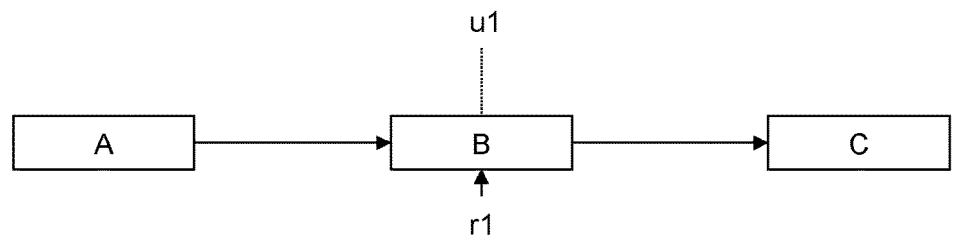
FIGS. 2A-2C are diagrammatic representations of a linked list of data elements undergoing a data element deletion according to a conventional read-copy update mechanism.
Figure 2B:
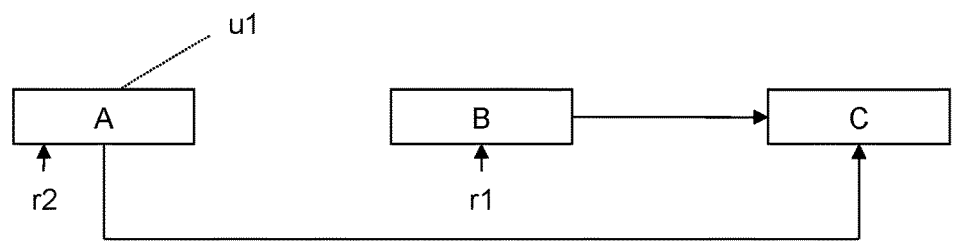
Figure 2C:
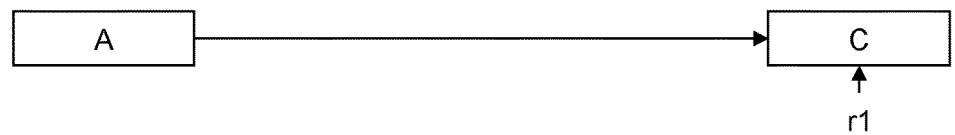
Figure 3:
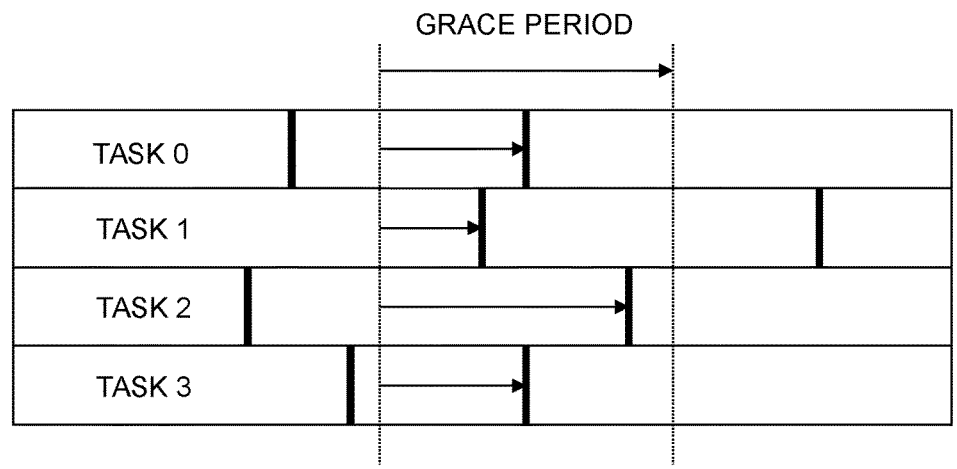
FIG. 3 is a flow diagram illustrating an example prior art grace period in which four processes pass through a quiescent state.
Figure 4:
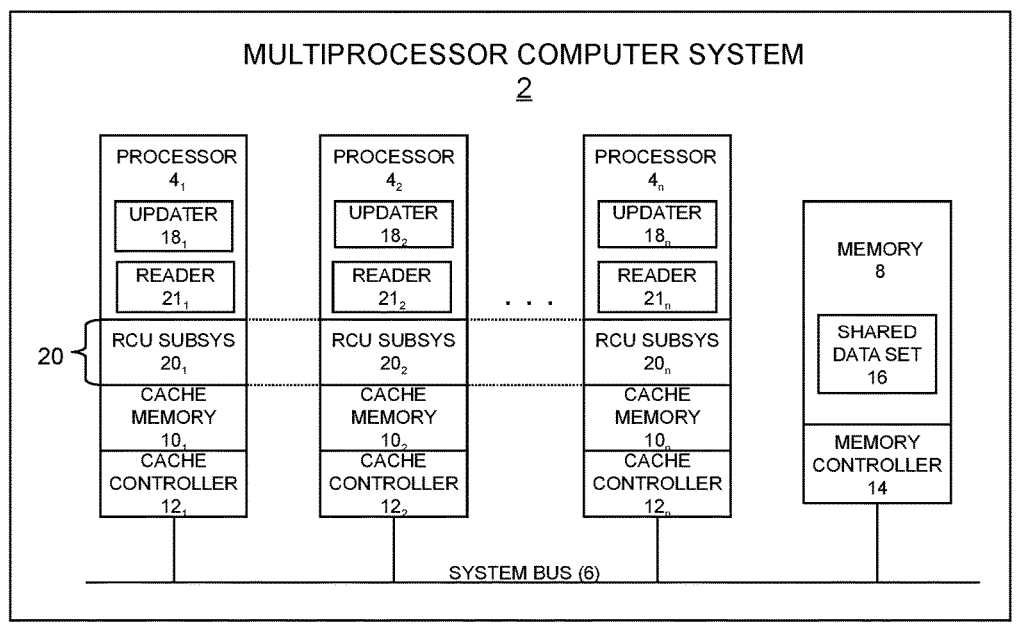
FIG. 4 is a functional block diagram showing a multiprocessor computing system.

Turning now to the figures, wherein like reference numerals represent like elements in all of the several views, FIG. 4 illustrates an example multiprocessor computer system 2 in which the disclosed RCU grace period technique supporting real-time CPU-bound in-kernel workloads may be implemented. In FIG. 4, the computer system 2 may include a plurality of processors $4_1, 4_2 \ldots 4_n$, a system bus 6, and a program memory 8. There may also be cache memories $10_1, 10_2 \ldots 10_n$ and cache controllers $12_1, 12_2 \ldots 12_n$ respectively associated with the processors $4_1, 4_2 \ldots 4_n$. A memory controller 14 may be associated with the memory 8. As shown, the memory controller 14 may reside separately from processors $4_2 \ldots 4_n$ (e.g., as part of a discrete chipset). Alternatively, the memory controller 14 could be provided by plural memory controller instances that are respectively integrated with the processors $4_1, 4_2 \ldots 4_n$.

The computer system 2 may represent any of several different types of computing apparatus. Such computing apparatus may include, but are not limited to, general purpose computers, special purpose computers, portable computing devices, communication and/or media player devices, set-top devices, embedded systems, and other types of information handling machines. The term "processor" as used with reference to the processors $4_1, 4_2 \ldots 4_n$ encompasses any program execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). Each such execution unit may also be referred to as a CPU (central processing unit). The processors $4_1, 4_2 \ldots 4_n$ may be situated within a single computing device or node (e.g., as part of a single-node SMP system) or they may be distributed over plural nodes (e.g., as part of a NUMA system, a cluster, or a cloud). The memory 8 may comprise any type of tangible storage medium capable of storing data in computer readable form for use in program execution, including but not limited to, any of various types of random access memory (RAM), various flavors of programmable read-only memory (PROM) (such as flash memory), and other types of primary storage (i.e., program memory). The cache memories $10_1$, $10_2 \ldots 10_n$ may be implemented in several levels (e.g., as level 1, level 2 and level 3 caches) and the cache controllers $12_1, 12_2 \ldots 12_n$ may collectively represent the cache controller logic that supports each cache level.

Each CPU embodied by a given processor 4 is operable to execute program instruction logic under the control of a software program stored in the memory 8 (or elsewhere). As part of this program execution logic, update operations (updaters) 18 may execute within a process, thread, or other execution context (hereinafter "task") on any of the processors 4. Each updater 18 may run from program instructions stored in the memory 8 (or elsewhere) in order to periodically to perform updates on a set of shared data 16 that may be stored in the shared memory 8 (or elsewhere). In FIG. 4, reference numerals $18_1, 18_2 \ldots 18_n$ illustrate individual data updaters that respectively execute on the several processors $4_1, 4_2 \ldots 4_n$. As described in the "Background" section above, the updates performed by an RCU updater can include modifying elements of a linked list, inserting new elements into the list, deleting elements from the list, and other types of operations. To facilitate such updates, the processors 4 may be programmed from instructions stored in the memory 8 (or elsewhere) to implement a read-copy update (RCU) subsystem 20 as part of their processor functions. In FIG. 4, reference numbers $20_1, 20_2 \ldots 20_n$ represent individual RCU instances that may respectively periodically execute on the several processors $4_1, 4_2 \ldots 4_n$. Operational details of the RCU subsystem 20 are described below.

Any given processor 4 may also periodically execute a read operation (reader) 21. Each reader 21 runs from program instructions stored in the memory 8 (or elsewhere) in order to periodically perform read operations on the set of shared data 16 stored in the shared memory 8 (or elsewhere). In FIG. 4, reference numerals $21_1, 21_2 \ldots 21_n$ illustrate individual reader instances that may respectively execute on the several processors $4_1, 4_2 \ldots 4_n$. Such read operations will typically be performed far more often than updates, this being one of the premises underlying the use of read-copy update. Moreover, it is possible for several of the readers 21 to maintain simultaneous references to one of the shared data elements 16 while an updater 18 updates the same data element.

In an example embodiment, the readers 21 may be preempted while executing within their RCU read-side critical sections. This would be the case, for example, if the readers 21 embody kernel code paths in a preemptible operating system kernel. To accommodate such reader preemption, the RCU subsystem 20 may be configured as a preemptible RCU implementation.

During operation of the computer system 2, an updater 18 may occasionally perform an update to one of the shared data elements 16. In accordance with the philosophy of RCU, a first-phase update may be performed in a manner that temporarily preserves a pre-update view of the shared data element for the benefit of readers 21 that may be concurrently referencing the shared data element during the update operation. Following the first-phase update, the updater 18 may call an RCU primitive such as synchronize_rcu( ), synchronize_sched( ), or call_rcu( ), etc., to invoke the RCU subsystem 20 to track an RCU grace period for deferred destruction of the pre-update view of the data (second-phase update). The grace period processing performed by the RCU subsystem 20 may entail starting new grace periods and detecting the end of old grace periods so that the RCU subsystem 20 knows when it is safe to free stale data (or take other actions).

Figure 5:
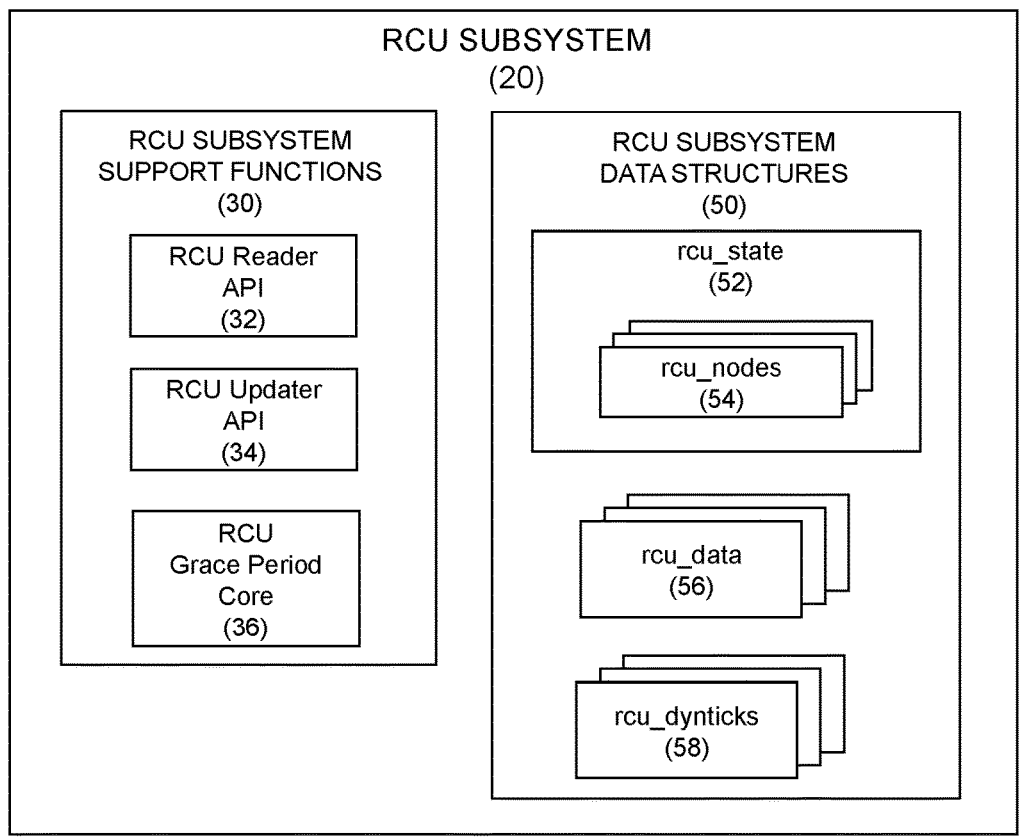
FIG. 5 is a functional block diagram showing an example RCU subsystem that may be provided in the computer system of FIG. 4.

Turning now to FIG. 5, example components of the RCU subsystem 20 are shown. Among these components is a set of RCU subsystem support functions 30, namely, an RCU reader API (Application Programming Interface) 32, an RCU updater API 34 and an RCU grace period processing core 36.

The RCU reader API 32 may comprise a reader registration component and a reader unregistration component that are respectively invoked by readers 21 as they enter and leave their RCU read-side critical sections to read the data 16. This allows the RCU subsystem 20 to track reader operations and determine when readers are engaged in RCU-protected read-side critical section processing. In an example embodiment, the reader registration and unregistration components may be respectively implemented using the rcu_read_lock( ) and rcu_read_unlock( ) primitives found in existing read-copy update implementations.

The RCU updater API 34 may include synchronization primitives such as synchronize_rcu( ), synchronize_sched( ), call_rcu( ), etc., for use by updaters 18 to defer removal of the data 16 that may be referenced by the readers 21 until an RCU grace period has elapsed.

The RCU grace period core 36 may include a set of functions that cooperate to perform various RCU grace period processing operations that may include starting new RCU grace periods and detecting the end of old RCU grace periods by waiting for CPUs 4 in the computer system 2 to pass through quiescent states. Some or all of these functions may be implemented within the context of a kernel thread (e.g. a Linux® kthread).

With continuing reference now to FIG. 5, the RCU subsystem 20 may further include a set of RCU subsystem data structures 50. In the illustrated embodiment, these data structures may include an rcu_state structure 52 having embedded therein (e.g., as a linear array) a combining tree of rcu_node structures 54. The RCU subsystem 20 thus supports hierarchical grace period detection, and may be characterized as a hierarchical RCU implementation. The tree of rcu_node structures 54 tracks information needed to determine when RCU grace periods have elapsed. Such tracked information may include, within each rcu_node structure 54, various quiescent state tracking structures that identify CPUs which have or have not passed through a quiescent state. Each leaf rcu_node structure 54 may additionally have a set of a per-processor rcu_data structures 56 assigned to it. Each rcu_data structure 56 represents one CPU in the computer system 2 and can be used to maintain rcu-related information specific to that CPU, such as RCU callback lists, quiescent-state and grace-period handling information, and other data. A set of per-CPU rcu_dynticks structures 58 may also be provided. Each of these structures maintains a counter that indicates whether or not a given CPU is in dynticks-idle mode.

As discussed in the "Background" section above, an RCU technique is needed that allows RCU grace periods to advance despite errors resulting in in-kernel infinite loops, but which also avoids sending IPIs to well-behaved real-time workloads that leverage in-kernel CPU-bound tight loops. This technique should not have to rely on scheduling-clock interrupts because there won't be any on CPUs that are configured not to use them.

A solution to this problem is to take a phased approach. If a grace period is delayed for a short time, a per-CPU variable may be set by a first operation of the RCU grace period core 36. This will cause a second operation of the RCU grace period core 36 to note a quiescent state for the CPU in question, thereby obviating the need for an IPI. In example embodiment, an existing bitmask variable called rcu_sched_qs_mask may be used as the per-CPU variable. Advantageously, setting the rcu_sched_qs_mask variable has the effect of causing an RCU function known as cond_resched_rcu_qs( ) to manipulate the CPU's RCU dyntick-idle state so as to inform the RCU grace period core 36 of the quiescent state. This means that in-kernel CPU-bound loops used by real-time workloads may prevent RCU grace period-induced IPIs if they contain at least one call to the cond_resched_rcu_qs( ) function. Advantageously, this is already a requirement for long-running CPU-bound loops in the Linux® kernel, whether real-time or not. A modified version of an RCU grace period core function known as rcu_implicit_dynticks_qs( ) may be used to set the per_CPU rcu_sched_qs_mask variable. The rcu_implicit_dynticks_qs( ) function handles RCU quiescent states on behalf of CPUs that have failed to report their quiescent state within a defined time.

Prior versions of rcu_implicit_dynticks_qs( ) handled the error case where a NOHZ_FULL workload loops indefinitely in the kernel with the scheduling-clock interrupt disabled. However, this error handling included IPIing the CPU running the offending loop, which is not what is wanted for real-time workloads. FIG. 6 illustrates the IPI processing 60 performed within a prior art Linux® kernel version 4.5 the rcu_implicit_dynticks_qs( ) function. Line 1 obtains the address of the rcu_sched_qs_mask field for the current CPU and assigns it to a pointer named rcrmp. Lines 2-4 check whether either a prescribed time interval (jiffies_till_sched_qs) has elapsed since the start of the current grace period, or a prescribed time point for rescheduling a reluctant CPU (jiffies_resched) has been reached. If so, line 5 uses rcrmp to reference the CPU's rcu_sched_qs_mask and determine whether a bit corresponding to the current flavor of RCU has not yet been set. If so, lines 6-7 update a →cond_resched_completed field in the CPU's rcu_data structure (rdp) to note the last grace period completed by the RCU grace period core. Line 8 invokes smb_mb( ) memory ordering so that the operation of lines 6-7 will be seen to occur before the operation of lines 9-10, which sets a bit in the CPU's rcu_sched_qs_mask variable for the current RCU flavor. Line 11 then calls resched_cpu( ), which issues an IPI to force the CPU into the scheduler, and line 12 sets a new jiffies_resched time point. Line 13 is reached if line 5 finds that the CPU's rcu_sched_qs_mask variable has already been set. It checks for the same jiffies_resched time point tested for in line 4. If this check is satisfied, line 15 calls resched_cpu( ), which issues an IPI to force the CPU into the scheduler, and line 12 sets a new jiffies_resched time point.

FIG. 7 depicts modified IPI processing 70 that may be performed in accordance to the present disclosure by a modified version of the Linux® kernel's rcu_implicit_dynticks_qs( ) function. This version uses the aforementioned phased approach for handling the error case where an RCU grace period delay is due to a NOHZ_FULL workload loops indefinitely in the kernel with the scheduling-clock interrupt disabled. In particular, the modified rcu_implicit_dynticks_qs( ) function splits the error handling, so that the setting of bits in the per-CPU rcu_sched_qs_mask variable is done relatively early, but with no IPI being invoked. If the grace period delay problem persists, the Linux® resched_cpu( ) function is eventually used to IPI the CPU containing the offending loop, but only after an extended time. Assuming that in-kernel CPU-bound loops used by real-time workloads contain frequent calls the cond_resched_rcu_qs( ) function (e.g., such as more than once per few tens of milliseconds), the workloads will never be IPIed. For example, the workload may protect itself by periodically invoking the cond_resched_rcu_qs( ) function at intervals that are less than the extended time frame in which IPIs are to be triggered in accordance with present disclosure.

As may be seen in FIG. 7, lines 1-10 of the modified IPI processing 70 are identical to lines 1-10 of the prior art IPI processing 60. Thereafter the processing differs. In particular, the resched_cpu( ) IPI invocation in line 11 of FIG. 6 is eliminated. Instead, once the rcu_sched_qs_mask variable is set in lines 9-10, processing advances directly to line 12 to set a new jiffies_resched time point. Line 20 of FIG. 7 will invoke resched_cpu( ) IPI processing to reschedule the CPU, but only after an extended period of time, as determined by check in line 19. This check determines whether the elapsed time interval since the start of the current grace period that is more than halfway to a specified RCU CPU stall-warning time (as determined by the rcu_jiffies_till_stall_check( ) function). This elapsed time interval should be sufficiently long to indicate an error condition requiring an IPI. A normal real-time CPU-bound workload looping indefinitely in the kernel with the scheduling-clock interrupt disabled should not reach this point, provided that it periodically runs the above-mentioned cond_resched_rcu_qs( ) function more often than the extended time period checked for in line 19.

Figure 8:
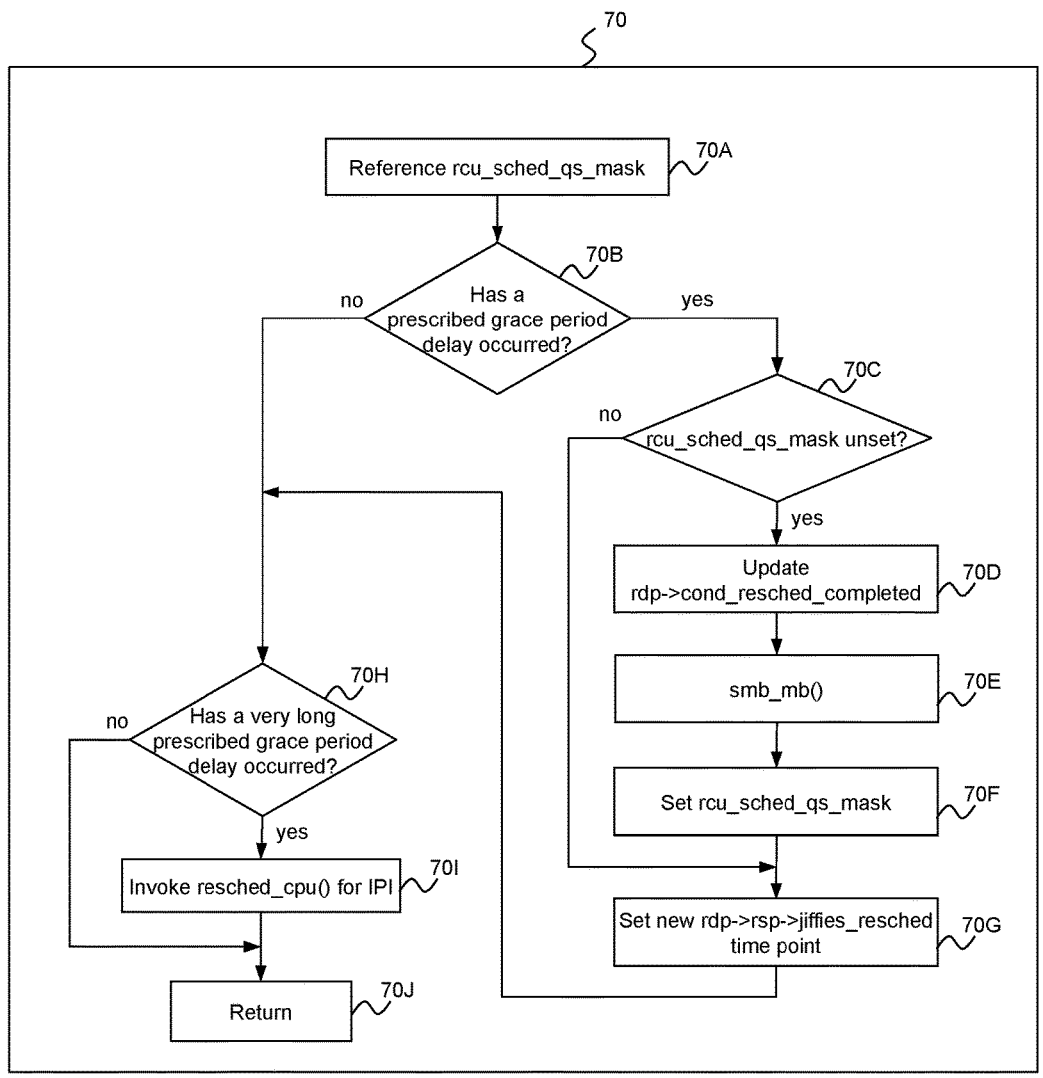
FIG. 8 is a flow diagram corresponding to the source code diagram of FIG. 7.

FIG. 8 is a flow chart corresponding to the modified IPI processing 70 of FIG. 7. Block 70A corresponds to line 1 of FIG. 7. Block 70B corresponds to lines 2-4 of FIG. 7. Block 70C corresponds to line 5 of FIG. 7. Block 70D corresponds to lines 6-7 of FIG. 7. Block 70E corresponds to line 8 of FIG. 7. Block 70F corresponds to lines 9-10 of FIG. 7. Block 70G corresponds to line 12 of FIG. 7. Block 70H corresponds to line 19 of FIG. 7. Block 70I corresponds to line 20 of FIG. 7. Block 70J corresponds to line 22 of FIG. 7.

It will be appreciated that the technique disclosed herein is not limited to the modified processing 70 shown in FIGS. 7 and 8, or to the particular functions or data structures shown therein. The principles set forth in the present disclosure do not require any particular function or data structure. Indeed, any suitable logic may be used that responds to a delayed quiescent state for a CPU running a workload running in a CPU-bound kernel loop by setting an indicator that may be utilized by the workload to record a quiescent state and avoid IPIs.

Figure 9:
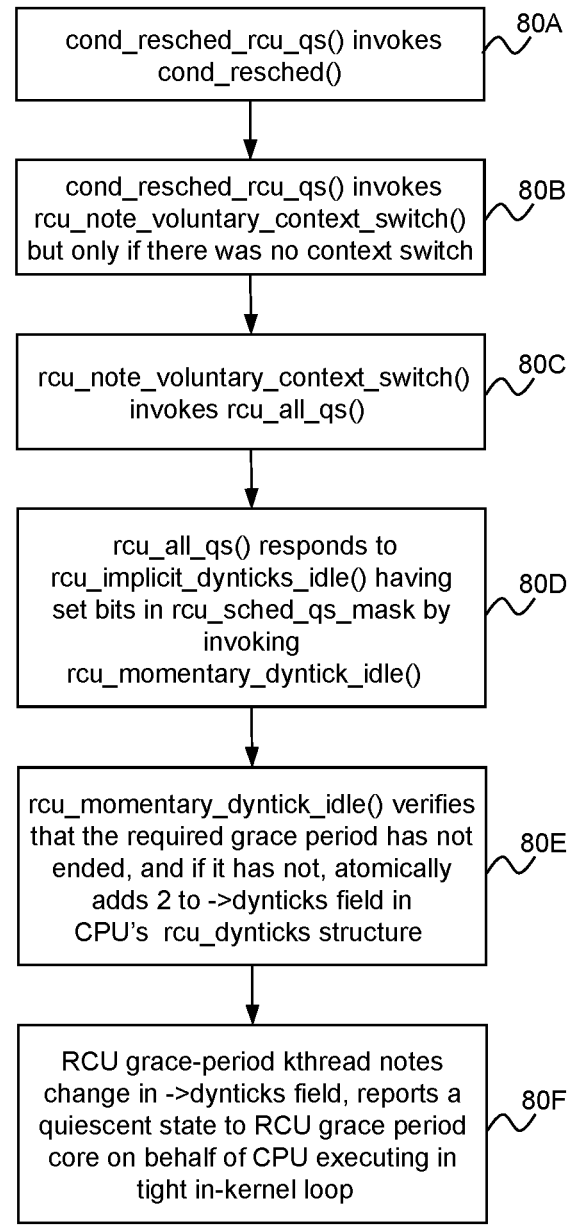
FIG. 9 is a flow diagram showing example flow of control through a series of Linux® kernel functions that may be used to support an embodiment of the present disclosure.

Turning now to FIG. 9, the flow control currently provided by the cond_resched_rcu_qs( ) function of the Linux® kernel to record a quiescent state in response to the rcu_sched_qs_mask variable is shown. In block 80A, the cond_resched_rcu_qs( ) function invokes a Linux® kernel function called cond_resched( ) to perform condition-based CPU rescheduling. In block 80B, the cond_resched_rcu_qs( ) function invokes a Linux® kernel function called rcu_note_voluntary_context_switch( ), but only if there was no context switch on the current CPU. If there was a context switch, any real-time workload running on the CPU will have just received a massive latency degradation, so there will be negligible additional impact due to the IPI that will be sent as a result of the later call from rcu_implicit_dyntick-s_qs( ) to resched_cpu( ). That context switch will supply the needed quiescent state, and this quiescent state will be communicated to the RCU grace period core 36 depending on the situation. If the context switch was to idle, the subsequent idle execution will be noted by the RCU grace period kthread via the →dynticks counter of the CPU's rcu_dynticks structure 58. If the context switch was due to a preemption, there will be two runnable tasks on the CPU with scheduling-clock interrupts enabled, so that a subsequent scheduling-clock interrupt will trigger RCU softirq processing, which will communicate the quiescent state to the RCU grace period core 36. Any other situation means there already were more than two runnable tasks on this CPU, so scheduling clock interrupts were already enabled, with processing proceeding as in the preceding sentence.

In block 80C, the rcu_note_voluntary_context_switch( ) function invokes a Linux® kernel function called rcu_all_qs( ). In block 80D, the rcu_all_qs( ) function responds to rcu_implicit_dynticks_qs( ) having set bits in the per-CPU rcu_sched_qs_mask variable by invoking a Linux® kernel function called rcu_momentary_dyntick_idle( ). In block 80E, the rcu_momentary_dyntick_idle( ) function verifies whether the required grace period has not already ended, and if it has not, it atomically adds the value 2 to the →dynticks field in the CPU's rcu_dynticks structure 58, and with full memory ordering. This leaves the CPU non-idle, but emulates a brief idle period that (as stated below in connection with block 80F) can be noted by the RCU grace-period kthread. In contrast, atomically incrementing by 1 would make the RCU grace period core 36 think there was an extended idle period, thus causing RCU to incorrectly ignore any subsequent RCU read-side critical sections. Because a given atomic addition satisfies all flavors of RCU, the function exits its loop after the first atomic addition is executed.

In block 80F, the RCU grace-period kthread will note the change in the →dynticks field, and will report a quiescent state to the RCU grace period core 36 on behalf of the CPU executing the tight in-kernel loop. Note that the rcu_implicit_dynticks_qs( ) function is invoked only from the RCU grace-period kthread, and therefore this function does not need to check for race conditions involving other CPUs terminating the current grace period.

It will be appreciated that the disclosed technique is not limited to the flow control shown in FIG. 9, or to any of the particular functions or data structures shown therein. For example, the above-discussed functions may be modified and/or new functions may be created that perform substantially the same or similar operations. By way of particular example, there is presently discussion underway of having the cond_resched( ) function discussed in block 80A subsume some or all of the cond_resched_rcu_qs( ) function of block 80A. More generally, it should be understood that the operations of FIG. 9 represent merely one embodiment of logic that may be used to achieve the end goal of responding to an indicator set on behalf of a workload running in a CPU-bound kernel loop by reporting an RCU quiescent state on behalf of the workload's CPU. In other embodiments, various other logic may be used to accomplish the same end goal.

Accordingly, a technique has been disclosed for enabling real-time CPU-bound in-kernel workloads to run infinite loops while keeping RCU grace periods finite. It will be appreciated that the foregoing concepts may be variously embodied in any of a data processing system, a machine implemented method, and a computer program product in which programming logic is provided by one or more computer readable data storage media for use in controlling a data processing system to perform the required functions. Example embodiments of a machine-implemented method and data processing system were previously described in connection with FIGS. 4-9.

With respect to a computer program product, digitally encoded program instructions may be stored on one or more non-transitory computer readable data storage media for use in controlling a computer or other information handling machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Example computer readable data storage media for storing such program instructions are shown by reference numerals 8 (memory) and 10 (cache) of the computer system 2 of FIG. 4. The computer system 2 may further include one or more secondary (or tertiary) storage devices (not shown) that could store the program instructions between system reboots. The computer system 2 could also store information on one or more remote servers (not shown), which could also include a computer readable storage medium for storing program instructions as described herein. A further example of a computer readable data storage medium that may be used to store the program instructions would be portable optical storage disks of the type that are conventionally used for commercial software sales, such as compact disk-read only memory (CD-ROM) disks, compact disk-read/write (CD-R/W) disks, and digital versatile disks (DVDs).

The computer readable storage medium can thus be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program code described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program code from the network and forwards the computer readable program code for storage in a computer readable storage medium within the respective computing/processing device.

Computer readable program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). As previously mentioned, in some embodiments, electronic circuitry including, for example, programmable logic circuitry, field-programmable gate arrays (FPGA), or programmable logic arrays (PLA) may execute the computer readable program code by utilizing state information of the computer readable program code to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program code.

The computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program code may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program code may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the disclosure. It is understood, therefore, that any invention as disclosed herein is not to be in any way limited except in accordance with the spirit of the appended claims and their equivalents.

What is claimed is:

1. A system, comprising:
    a plurality of CPUs;
    a memory coupled to the CPUs, the memory including a non-transitory computer readable storage medium tangibly embodying at least one program of instructions executable by the CPUs to perform operations for enabling a real-time CPU-bound in-kernel workload to run an infinite loop while keeping read-copy update (RCU) grace periods finite, the operations comprising:
        setting a per-CPU indicator to indicate that a CPU running the CPU-bound in-kernel workload has not reported an RCU quiescent state within a first defined time;
        invoking from within the workload an RCU grace period operation that causes an RCU quiescent state to be reported on behalf of the CPU in response to the per-CPU indicator being set; and
    rescheduling the CPU in response to the RCU quiescent state not being reported within a longer second defined time that is longer than the first defined time and sufficiently long to indicate an error condition requiring CPU rescheduling.

2. The system of claim 1, wherein the indicator is set by an RCU grace period operation that handles quiescent states on behalf of CPUs that have failed to report a quiescent state within the first defined time, and which forces the CPUs to be rescheduled in response to the RCU quiescent state not being reported within the longer second defined time.

3. The system of claim 1, wherein the operation that causes the RCU quiescent state to be reported is periodically invoked while the workload is active.

4. The system of claim 1, wherein the operation that causes the RCU quiescent state to be reported is periodically invoked by the workload at an interval that is shorter than the longer second defined time.

5. The system of claim 1, wherein the longer second defined time is based on an RCU CPU stall warning time.

6. The system of claim 1, wherein the longer second defined time represents a time since the beginning of a current grace period that is more than halfway to an RCU CPU stall warning time.

7. The system of claim 1, wherein the operation that causes the RCU quiescent state to be reported invokes a flow of control that causes an RCU quiescent state to be reported due to manipulation of an RCU dyntick-idle state of the CPU.

8. A computer program product, comprising:
one or more non-transitory computer readable data storage media;
program instructions stored on the one or more computer readable data storage media for programming a data processing platform having a plurality of CPUs to perform operations for enabling a real-time CPU-bound in-kernel workload to run an infinite loop while keeping read-copy update (RCU) grace periods finite, the operations comprising:
setting a per-CPU indicator to indicate that a CPU running the CPU-bound in-kernel workload has not reported an RCU quiescent state within a first defined time;
invoking from within the workload an RCU grace period operation that causes an RCU quiescent state to be reported on behalf of the CPU in response to the per-CPU indicator being set; and
rescheduling the CPU in response to the RCU quiescent state being not reported within a longer second defined time that is longer than the first defined time and sufficiently long to indicate an error condition requiring CPU rescheduling.

9. The computer program product of claim 8, wherein the indicator is set by an RCU grace period operation that handles quiescent states on behalf of CPUs that have failed to report a quiescent state within the first defined time, and which forces the CPUs to be rescheduled in response to the quiescent state being not reported within the longer second defined time.

10. The computer program product of claim 8, wherein the operation that causes the RCU quiescent state to be reported is periodically invoked while the workload is active.

11. The computer program product of claim 8, wherein the operation that causes the RCU quiescent state to be reported is periodically invoked by the workload at an interval that is shorter than the longer second defined time.

12. The computer program product of claim 8, wherein the longer second defined time is based on an RCU CPU stall warning time.

13. The computer program product of claim 8, wherein the function that causes the RCU quiescent state to be reported invokes a flow of control that causes an RCU quiescent state to be reported due to manipulation of an RCU dyntick-idle state of the CPU.

* * * * *